United States Patent Office 2,847,418
Patented Aug. 12, 1958

2,847,418

DI(HYDROXYETHYL) IMIDAZOLIDONE-2 AND PRODUCTION OF N,N'-DI-(2-HYDROXYETHYL) ETHYLENE DIAMINE

Arthur B. Steele, Ossining, N. Y., assignor to Union Carbide Corporation, a corporation of New York No Drawing. Application May 6, 1955
Serial No. 506,668

12 Claims. (Cl. 260—309.7)

This invention relates to a process for the production of N,N'-di-(2-hydroxyethyl)ethylene diamine. More particularly, this invention is directed to a process for the production of N,N'-di-(2-hydroxyethyl)ethylene diamine utilizing a novel synthesis route with the concurrent formation of intermediates useful as a plasticizer for glue, casein and zein.

Heretofore, processes for the production of hydroxyethyl derivatives of ethylene diamine involved the use of ethylene oxide as the hydroxyethylating agent for the diamine. These processes suffer serious disadvantages among which the most irksome is that the reaction of ethylene oxide with ethylene diamine yields mono-, di-, tri-, and tetra-(2-hydroxyethyl)ethylene diamines, the proportion of each compound in the total product being determined, in part, by the mole ratio of the oxide to the diamine. Obviously, control of the molar quantities of the reactants can provide an abundance of either the mono- or tetra-hydroxyethylated ethylene diamine. But, however, the di- and tri-hydroxyethylated ethylene diamines cannot be produced as primary products by this method and are only recoverable as coproducts the supply of coproducts being dependent upon the demand for the primary products. A further complication develops in the case of the di-(2-hydroxyethyl)ethylene diamine since when ethylene oxide is reacted with ethylene diamine in the proper mole ratios, two isomers are produced, namely, the N,N-di-(2-hydroxyethyl)ethylene diamine and the N,N'-di-(2-hydroxyethyl)ethylene diamine and the desired N,N'-di-(2-hydroxyethyl)ethylene diamine can only be recovered after careful resolution of the isomers.

It has been discovered that N,N'-di-(2-hydroxyethyl) ethylene diamine can be produced as a primary product and not as a coproduct by heating the carbonate salts of mixtures of monoethanolamine and diethanolamine at elevated temperatures and under superatmospheric pressures.

As pointed out above, the N,N'-di-(2-hydroxyethyl) ethylene diamine is produced as a primary product of the process of this invention and not as a coproduct as in the ethylene oxide-ethylene diamine process. The present invention is based on the discovery that N,N'-di-(2-hydroxyethyl)ethylene diamine is produced as a primary product by reacting a mixture comprising monoethanolamine, diethanolamine and carbon dioxide or a mixture of the carbonate salts of monoethanolamine and diethanolamine at elevated temperatures under superatmospheric pressures. Although the mechanism of this new synthesis is not known with certainty, it appears that in the process of the invention that diethanolamine and carbon dioxide form the diethanolammonium carbonate. The diethanolammonium carbonate is converted to 3-(2-hydroxyethyl)oxazolidone-2, which, in the presence of monoethanolamine is converted into 1,3-di-(2-hydroxyethyl)imidazolidone-2, whereupon the substituted imidazolidone can be hydrolysed to N,N'-di-(2-hydroxyethyl)-ethylene diamine and carbon dioxide. In view of the fact that the second intermediate, 1,3-di-(2-hydroxyethyl)-imidazolidone-2, has been isolated in good yield and has been carefully purified and characterized and in view of the fact that the substituted imidazolidone hydrolyses to the desired N,N'-di-(2-hydroxyethyl)ethylene diamine, the proposed mechanism is in keeping with the observation that only the symmetrical isomer of di-(2-hydroxyethyl)-ethylene diamine is synthesized in the process of this invention. However, the invention should not be considered as being limited by any particular theory or explanation. For purposes of illustration only the overall reactions may be illustrated as follows:

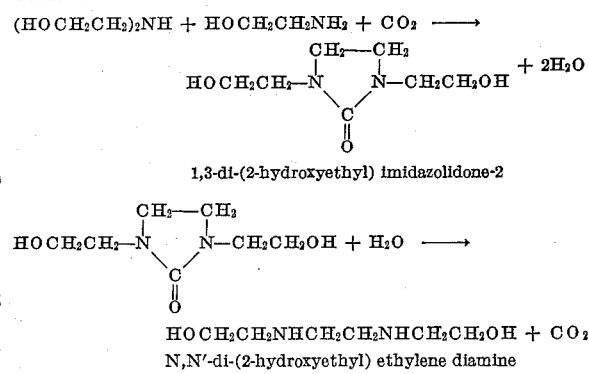

1,3-di-(2-hydroxyethyl) imidazolidone-2

$HOCH_2CH_2NHCH_2CH_2NHCH_2CH_2OH + CO_2$

N,N'-di-(2-hydroxyethyl) ethylene diamine

In carrying out the process of this invention, temperatures in the range of from 100° C. to 250° C. have been found satisfactory. It is preferred, however, to employ temperatures in the range of from 130° to 200° C.

A superatmospheric pressure of at least 150 pounds per square inch absolute is sufficient depending on the temperature employed. Generally, elevated pressures in the range of from 150 to 1000 pounds per square inch and preferably pressures in the range of from 200 to 600 pounds per square inch can be employed. The pressure desired for the reaction may be the pressure which is derived for the most part as a result of the heating of the reactants in a closed vessel or the pressure desired can be externally applied pressure derived by the imposition of a gas, such as carbon dioxide, nitrogen or mixtures of gases, over the reaction medium. As a matter of practical convenience, however, the reactants are charged to a stainless steel pressure autoclave and heated to the desired temperature and pressure.

The molar amounts of the reactants, monoethanolamine and diethanolamine, that can be employed varies over a wide range. It is preferred, however, to employ molar ratios of monoethanolamine to diethanolamine in the range of from 10:1 to 1:10 when operating in the preferred temperature range. Similarly, the molar ratio of total amine present to carbon dioxide is even less critical and can be varied over a wide range. Typical molar ratios of amines to carbon dioxide which are employed with success fall in the range of from 5:1 to 1:1.

In carrying out the process of this invention, the reactants can be employed undiluted or diluted with suitable solvents such as water or diethylene glycol and the like. In practicing the invention, it is preferred to employ water as a diluent or solvent mainly because of its low cost, ease of removal from the reaction product and its excellent solvent power for both reactants and products.

In a typical operation of the process of this invention, a mixture of monoethanolamine, diethanolamine and water is saturated with carbon dioxide and heated in a stainless steel pressure autoclave for a period of time, at an elevated temperature and pressure. The reaction mass is then cooled and the contents of the autoclave discharged and fractionally distilled at atmospheric pressure to remove carbon dioxide and water. The water and carbon dioxide can be recycled if desired. The organic amine residue is then further distilled at reduced pressures and the product, N,N'-di-(2-hydroxyethyl) ethylene diamine, recovered. Unreacted monoethanolamine and diethanolamine are recoverable and can be recycled, if desired.

The following examples will serve to illustrate the practice of the invention:

EXAMPLE 1

*Preparation of N,N'-di-(2-hydroxyethyl)ethylene diamine*

A mixture of 320 grams (5.25 moles) of monoethanolamine, 184 grams (1.75 moles) of diethanolamine, and 1008 grams of water was saturated with carbon dioxide (176 grams) and heated in a stainless steel pressure autoclave for 72 hours at 170° C. and 680 pounds per square inch gage pressure. After the reaction mass had been cooled to 30° C., the contents of the autoclave were discharged and fractionally distilled at atmospheric pressure to remove carbon dioxide and water. The residue was then fractionally distilled under reduced pressures in the range of from 2 down to 0.15 mm. of Hg absolute. The yield of N,N'-di-(2-hydroxyethyl)ethylene diamine was approximately 7 percent together with a 50 percent conversion of the amines to 1,3-di-(2-hydroxyethyl)imidazolidone-2. The latter product, 1,3-di-(2-hydroxyethyl)imidazolidone-2, was hydrolysed quantitatively by heating in the presence of a molar equivalent of 5 percent of aqueous sodium hydroxide to N,N'-di-(2-hydroxyethyl)ethylene diamine, providing an overall conversion of the amines to the desired N,N'-di-(2-hydroxyethyl)ethylene diamine, equivalent to 57 percent.

PHYSICAL PROPERTIES OF N,N'-DI-(2-HYDROXYETHYL)ETHYLENE DIAMINE

Physical state, 25° C._____ White crystalline solid.
Melting point_____ 98–99° C.
Boiling point_____ 135–137° C. at 0.1 mm. Hg.
 182° C. at 4 mm. Hg.
 197° C. at 10 mm. Hg.
Equivalent weight,
 by titration:
  Theoretical_____ 74.0
  Found_____ 74.2
Nitrogen content, percent
 by weight:
  Theoretical_____ 18.9
  Found_____ 18.9

PHYSICAL PROPERTIES OF 1,3-DI-(2-HYDROXYETHYL)IMIDAZOLIDONE-2

Physical state, 25° C._____ Viscous liquid.
Specific gravity, 25/20° C._ 1.229.
Refractive index, 20° C.___ 1.4926.
Boiling point_____ 189–191° C. at 0.2 mm. Hg.
Nitrogen content, percent
 by weight:
  Theoretical_____ 16.1
  Found_____ 16.1

EXAMPLE 2

*Preparation of N,N'-di-(2-hydroxyethyl)ethylene diamine*

Into a 3-liter pressure autoclave was charged a mixture comprising 244 grams (4 moles) of monoethanolamine, 210 grams (2 moles) of diethanolamine and 1200 grams of water. The aqueous amine solution was saturated at 25° C. with carbon dioxide (140 grams, 3.2 moles) and heated under a pressure of 520 pounds per square inch gage pressure at 155° C. for 30 hours. The crude reaction mass was then cooled, discharged from the autoclave and fractionally distilled at reduced pressures to remove water, carbon dioxide and unreacted amines. The residue (269 grams) was dissolved in 250 grams of distilled water and the solution treated with cation exchange resin which had been prepared for the hydrogen cycle by treatment with dilute sulfuric acid. A 5-minute contact of the resin was adequate to remove all of the basic components from the crude product. The resin was recovered by filtration and the filtrate carefully distilled to provide an uncontaminated distillate of 1,3-di-(2-hydroxyethyl)imidazolidone-2, boiling at 190–192° C. at 0.2 mm. of Hg pressure absolute and having a specific gravity 25/20° C. of 1.229. The product weighed 182 grams, equivalent to a yield of 52 percent, based on the diethanolamine charged to the reactor. The product, 1,3-di-(2-hydroxyethyl)imidazolidone-2, was saponified by heating at a temperature in the range of from 120–125° C. with a molar equivalent of 5 percent of aqueous sodium hydroxide and converted to N,N'-di-(2-hydroxyethyl) ethylene diamine which was recovered by extracting with a 1,4-dioxane-toluene solution. Conversion of the 1,3-di-(2-hydroxyethyl)imidazolidone-2 to the desired N,N'-di-(2-hydroxyethyl)ethylene diamine appeared to be quantitative. The cation exchange resin was also washed with aqueous sodium hydroxide to remove the organic bases which were then further purified by fractional distillation and 21 grams of N,N'-di-(2-hydroxyethyl)ethylene diamine were recovered.

I claim:

1. 1,3-di-(2-hydroxyethyl)-imidazolidone-2.

2. A process for the production of a mixture comprising N,N'-di-(2-hydroxyethyl)ethylene diamine and 1,3-di-(2-hydroxyethyl)imidazolidone-2 which comprises reacting a mixture comprising monoethanolamine, diethanolamine and carbon dioxide at an elevated temperature in the range of from 100° C. to 250° C. under superatmospheric pressures of at least 150 pounds per square inch absolute.

3. A process for the production of a mixture comprising N,N'-di-(2-hydroxyethyl)ethylene diamine and 1,3-di-(2-hydroxyethyl)imidazolidone-2 which comprises reacting an aqueous mixture comprising monoethanolamine, diethanolamine and carbon dioxide at an elevated temperature in the range of from 100° C. to 250° C. under superatmospheric pressures of at least 150 pounds per square inch absolute.

4. A process for the production of a mixture comprising N,N'-di-(2-hydroxyethyl)ethylene diamine and 1,3-di-(2-hydroxyethyl)imidazolidone-2 which comprises reacting an aqueous mixture containing monoethanolamine and diethanolamine in molar ratios of from 10:1 to 1:10 with carbon dioxide at an elevated temperature of from 130° C. to 200° C. under superatmospheric pressures in the range of from 200 to 600 pounds per square inch absolute.

5. A process for the production of a mixture comprising N,N'-di-(2-hydroxyethyl)ethylene diamine and 1,3-di-(2-hydroxyethyl)imidazolidone-2 which comprises reacting an aqueous mixture containing monoethanolamine and diethanolamine in molar ratios of from 10:1 to 1:10 with carbon dioxide in a molar ratio of from 5:1 to 1:1 of amines to carbon dioxide at an elevated temperature of from 130° C. to 200° C. under superatmospheric pressures in the range of from 200 to 600 pounds per square inch absolute.

6. A process for the production of 1,3-di-(2-hydroxyethyl)imidazolidone-2 which comprises reacting a mixture of monoethanolamine and diethanolamine with carbon dioxide at an elevated temperature in the range of from 130° C. to 200° C. under superatmospheric pressures in the range of from 200 to 600 pounds per square inch absolute to form a reaction mixture comprising N,N'-di-(2-hydroxyethyl)ethylene diamine and 1,3-di-(2-hydroxyethyl)imidazolidone-2 and recovering said imidazolidone.

7. A process for the production of 1,3-di-(2-hydroxyethyl)imidazolidone-2 which comprises reacting an aqueous mixture of monoethanolamine and diethanolamine with carbon dioxide at an elevated temperature in the range of from 130° C. to 200° C. under superatmospheric pressures in the range of from 200 to 600 pounds per square inch absolute to form a reaction mixture comprising N,N'-di-(2-hydroxyethyl)ethylene diamine and 1,3-di-(2-hydroxyethyl)imidazolidone-2 and recovering said imidazolidone.

8. A process for the production of 1,3-di-(2-hydroxyethyl)imidazolidone-2 which comprises reacting an aqueous mixture containing monoethanolamine and diethanolamine in molar ratios of from 10:1 to 1:10 with carbon dioxide at an elevated temperature of from 130° C. to 200° C. under superatmospheric pressures in the range of from 200 to 600 pounds per square inch absolute to form a reaction mixture comprising N,N'-di-(2-hydroxyethyl)ethylene diamine and 1,3-di-(2-hydroxyethyl)-imidazolidone-2 and recovering said imidazolidone.

9. A process for the production of 1,3-di-(2-hydroxyethyl)imidazolidone-2 which comprises reacting a mixture containing monoethanolamine and diethanolamine in molar ratios of from 10:1 to 1:10 with carbon dioxide in a molar ratio of from 5:1 to 1:1 of amines to carbon dioxide at an elevated temperature of from 130° C. to 200° C. under superatmospheric pressures in the range of from 200 to 600 pounds per square inch absolute to form a reaction mixture comprising N,N'-di-(2-hydroxyethyl)ethylene diamine and 1,3-di-(2-hydroxyethyl)imidazolidone-2 and recovering said imidazolidone.

10. A process for the production of 1,3-di-(2-hydroxyethyl)imidazolidone-2 which comprises reacting an aqueous mixture containing monoethanolamine and diethanolamine in molar ratios of from 10:1 to 1:10 with carbon dioxide in a molar ratio of from 5:1 to 1:1 of amines to carbon dioxide at an elevated temperature of from 130° C. to 200° C. under superatmospheric pressures in the range of from 200 to 600 pounds per square inch absolute to form a reaction mixture comprising N,N'-di-(2-hydroxyethyl)ethylene diamine and 1,3-di-(2-hydroxyethyl)imidazolidone-2 and recovering said imidazolidone.

11. A process for the production of N,N'-di-(2-hydroxyethyl)ethylene diamine which comprises reacting an aqueous mixture containing monoethanolamine and diethanolamine in molar ratios of from 10:1 to 1:10 with carbon dioxide in a molar ratio of from 5:1 to 1:1 of amines to carbon dioxide at an elevated temperature of from 130° C. to 200° C. under superatmospheric pressures in the range of from 200 to 600 pounds per square inch absolute to form a reaction mixture comprising N,N'-di(2-hydroxyethyl)ethylene diamine and 1,3-di-(2-hydroxyethyl)imidazolidone-2; and hydrolysing said imidazolidone in said reaction mixture to produce additional N,N'-di-(2-hydroxyethyl)ethylene diamine.

12. A process for the production of N,N'-di-(2-hydroxyethyl)ethylene diamine which comprises reacting an aqueous mixture containing monoethanolamine and diethanolamine in molar ratios of from 10:1 to 1:10 with carbon dioxide in a molar ratio of from 5:1 to 1:1 of amines to carbon dioxide at an elevated temperature of from 130° C. to 200° C. under superatmospheric pressures in the range of from 200 to 600 pounds per square inch absolute to form 1,3-di-(2-hydroxyethyl)imidazolidone-2; and hydrolysing said imidazolidone to produce N,N'-di-(2-hydroxyethyl)ethylene diamine.

References Cited in the file of this patent
UNITED STATES PATENTS
2,613,210    Hurwitz et al. _____ Oct. 7, 1952